July 18, 1950 C. W. BERTHIEZ 2,516,043
PORTABLE CONTROL SET FOR MACHINE TOOLS AND
HOISTING OR LIFTING APPARATUS
Filed April 11, 1945 3 Sheets-Sheet 1

Charles William Berthiez
INVENTOR
By George H. Corey
His Attorney

July 18, 1950 C. W. BERTHIEZ 2,516,043
PORTABLE CONTROL SET FOR MACHINE TOOLS AND
HOISTING OR LIFTING APPARATUS
Filed April 11, 1945 3 Sheets-Sheet 2
Fig. 3
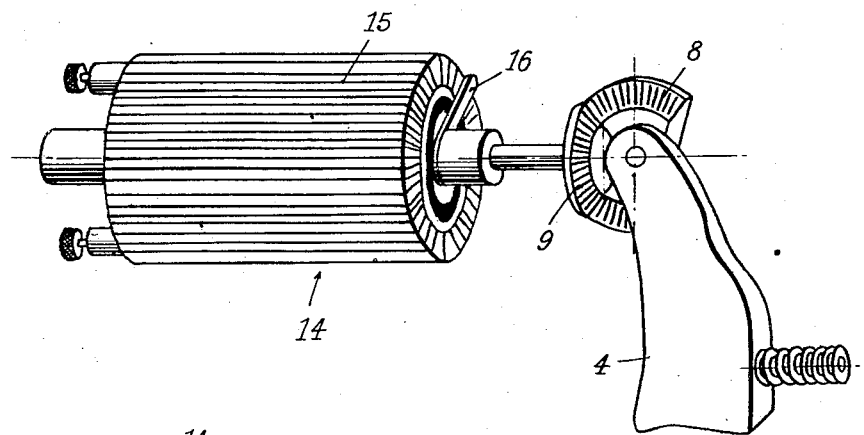
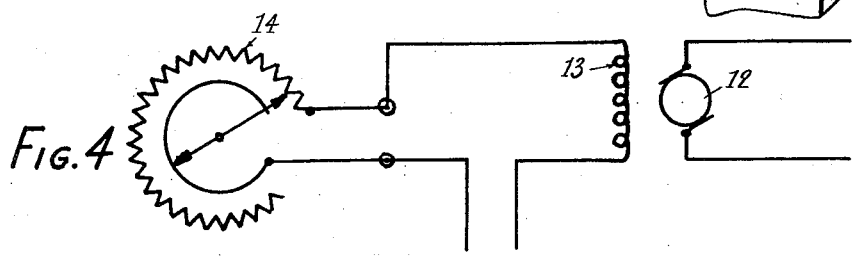
Fig. 4
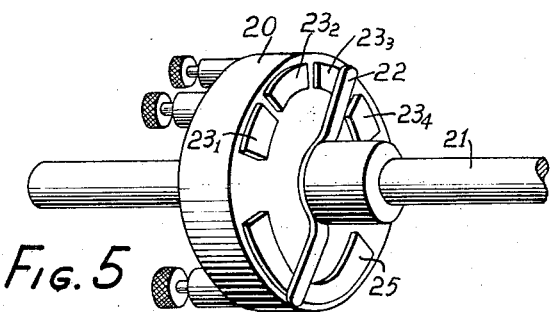
Fig. 5
Charles William Berthiez
INVENTOR
By George H. Corey
His Attorney July 18, 1950 C. W. BERTHIEZ 2,516,043
PORTABLE CONTROL SET FOR MACHINE TOOLS AND
HOISTING OR LIFTING APPARATUS
Filed April 11, 1945 3 Sheets-Sheet 3
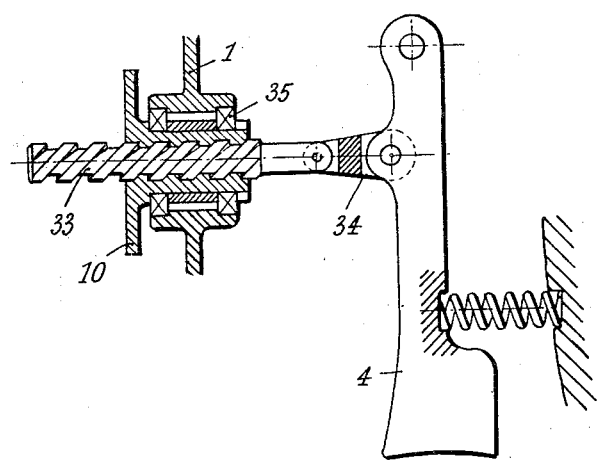
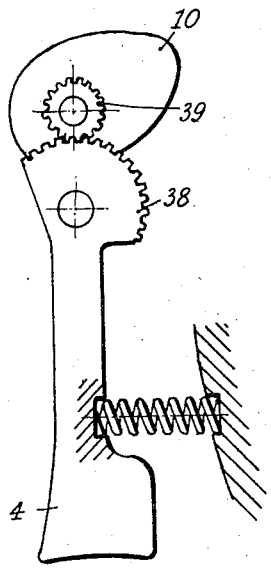
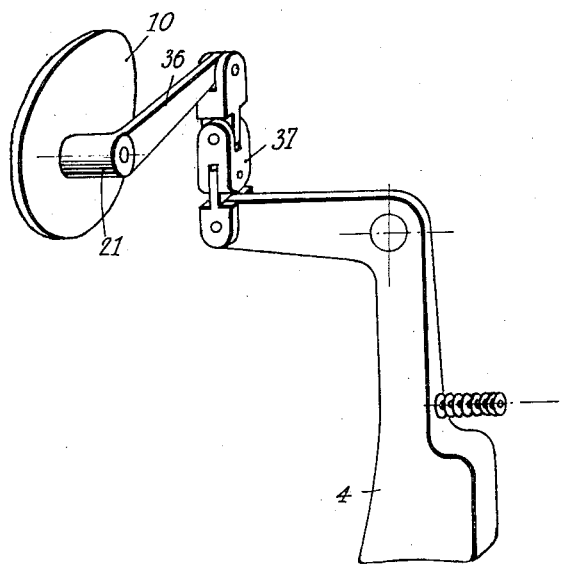
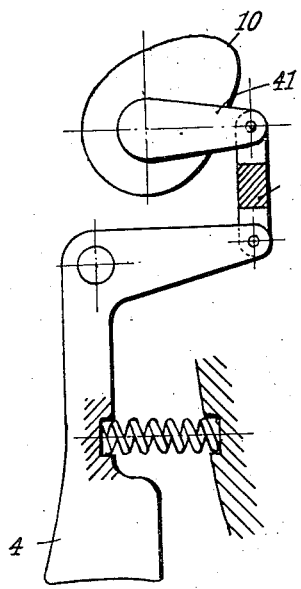
Charles William Berthiez
INVENTOR
By George H. Corey
His Attorney Patented July 18, 1950

2,516,043

UNITED STATES PATENT OFFICE 2,516,043

PORTABLE CONTROL SET FOR MACHINE TOOLS AND HOISTING OR LIFTING APPARATUS

Charles William Berthiez, Paris, France

Application April 11, 1945, Serial No. 587,778
In France December 15, 1943

Section 1, Public Law 690, August 8, 1946
Patent expires December 15, 1963

6 Claims. (Cl. 318—551)

Remote control devices are already known for controlling from a distance the motions of certain movable members of a machine or apparatus. However, devices used heretofore are either for stationary mounting or, where they can be transported, their structure is more or less intricate so that they cannot be conveniently held in hand by the worker. Moreover, such devices for the remote control are not constructed to carry accessory parts for illumination or other purpose permitting the operation being performed to be facilitated or accelerated.

The present invention has for its primary object to provide a new portable set for the remote control of various machines and apparatus, this set being specially conceived for being conveniently held in hand by the worker while possessing great operational flexibility and a capacity to be well adapted to the instinctive reactions of the worker whenever any manipulation or adjustment is required of him.

Another object of the invention is to provide a remote control set as aforesaid comprising a handle similar in shape to a revolver butt so as to be very easily grasped by the workers' hand, said handle carrying a manually operable lever, conveniently in the form of a guard-protected trigger, so positively connected to regulating means for the machine part to be controlled as to vary a function related to the motion of said machine part upon varying operation of the lever.

A further object of the invention is to provide a remote control set of portable nature as aforesaid also comprising a lighting device preferably of adjustable orientation permitting a beam of light to be thrown at will by the worker towards the spot where the work is to be carried out.

A still further object of the invention is to provide a portable control set as aforesaid wherein, by the mere actuation of a trigger or similar rockable lever, regulating means may be so controlled at will as to secure the proper operating conditions of an electric motor driving the movable machine part the operation of which is required to be modified to suit certain requirements.

With these and such other objects in view as will incidentally appear hereafter, the invention comprises the novel construction and combination of parts that will now be described more in detail with reference to the accompanying diagrammatic drawings exemplifying suitable embodiments of the same and forming a part of the present disclosure.

In the drawings:

Fig. 3 is a perspective view showing the trigger used in the set and a control resistance or rheostat associated therewith.

Fig. 4 is a diagram of a circuit showing the use of this rheostat.

Fig. 5 is a perspective view of a switch by which the speeds of the aforesaid motor may be controlled, the said switch being in turn controlled by the trigger of said portable set.

Figs. 6 to 9 are views illustrating several constructional modifications of portions of portable control sets according to the invention.

Figure 1:
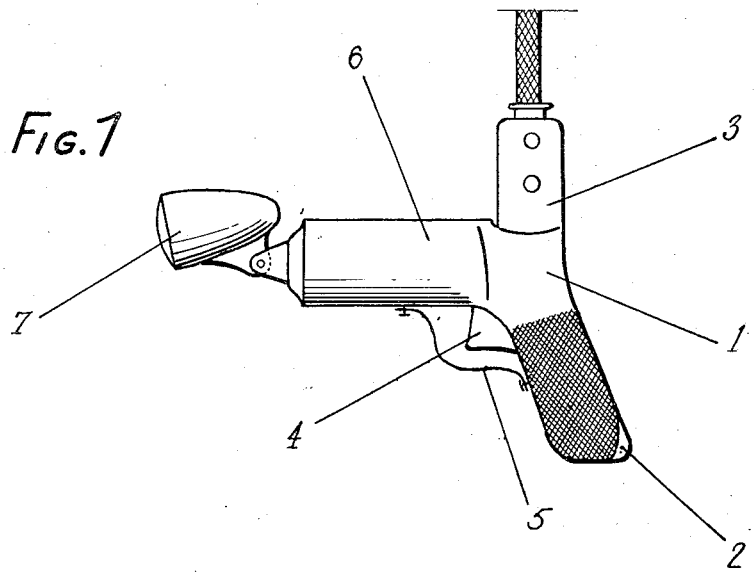
Fig. 1 is an elevational view of a portable control set according to the invention.
Figure 2:
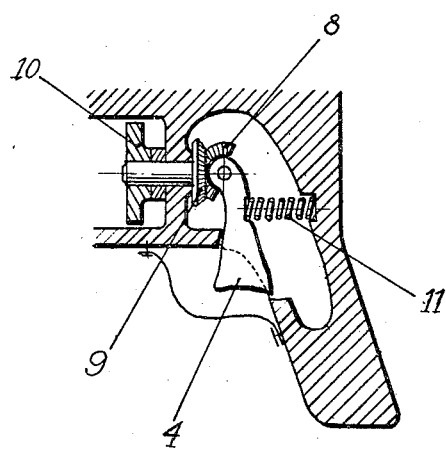
Fig. 2 is a longitudinal sectional view of a portion of this set.

As will be seen from the drawings, the portable set for remote control shown in Figs. 1 and 2 comprises a body 1 provided with a handle 2 similar to a revolver butt and permitting this portable set to be conveniently grasped by the worker's hand. A push-button switch case 3 connected to the body 1 of the set comprises a starting push-button switch and a stopping push-button switch for operating the motor or the mechanism which controls the movable part of the machine to be adjusted or controlled. Inside the body 1 of the set is pivotally mounted a control trigger 4 by means of which the worker can effect, as will be seen hereafter, the several manipulations that are required. The trigger 4 is protected by a guard 5 similar to a revolver guard. In the barrel 6 of the portable set is arranged a regulator or a switch, such as are shown in Figs. 3 and 5, adapted directly or indirectly to control the variations of the motion of the movable member which requires to be adjusted or controlled (stroke, speed, etc.). This regulator or switch and its operative connections with the movable member of the machine may be of any type suitable for the type of machine to the control of which the present invention has reference, these connections themselves not being represented in the drawings since they per se do not form part of the invention.

At the tip end of the barrel extension 6 of the body 1 is provided a lighting device 7, Fig. 1, preferably movably supported thereon so as to be orientable, which permits the worker locally to illuminate the working zone while continuing, by pressing his finger on the trigger 4, to control the variations of the motion being performed. The lighting device may be of the type having a parabolic reflector or of any other suitable type.

Owing to this particular combination of the lighting device 7 and control trigger 4, a great facility and rapidity of manipulation and adjustment is achieved since the operator can proceed with such operations from the very spot where his observation of the work takes place and such observation is at the same time facilitated by the lighting device.

In Fig. 2 is shown in section and in detail how the regulator may be positively controlled by means of the trigger 4. To that end, the pivotal pin on which the trigger 4 is mounted for rocking motion with respect to the body 1 of the set carries a toothed sector 8 having bevel teeth and meshing with a bevel pinion 9 mounted on a stub shaft which also carries a cam 10 which acts upon the controlled or movable member of the regulator (not shown in Fig. 2). A spring 11 acts as a return spring for the trigger 4.

It will be seen from the foregoing that the progressive action of the finger on the trigger 4 causes rotation of the cam 10 and consequently a progressive variation of the selected function being controlled. The cam outline may be so selected as to cause the sensitiveness of the device to vary as the trigger is moved to a greater or less degree, thereby enabling the accuracy of the manual adjustment to be enhanced over a preferred range of the particular functional values.

In Figs. 3 and 4 is shown by way of example how the invention may be applied for regulating the speed of a member of a machine operated by an electric motor whose speed may be varied by influencing its field. In this case, the motor 12 which may be connected to the member to be driven includes as usual an exciting winding 13 whose circuit comprises a rheostat 14 by means of which the field excitation may be varied, i. e. the speed of the motor and consequently the speed of the controlled member may be varied.

In accordance with this embodiment of the invention, as shown in Fig. 3, the rheostat 14 may be arranged in the barrel 6, Fig. 1, of the portable control set (instead of the cam 10 and regulator to which reference was made when describing Figs. 1 and 2).

The rheostat 14 is constituted for example (as will be seen from Fig. 3) by an annularly wound winding 15 on which a revoluble contact arm 16 carried on spindle 21 may be moved, this arm being actuated (as the cam 10 in the preceding embodiment) by the trigger 4 and the two bevel pinions 8 and 9.

It should be observed that the motor 12 might also be the exciting generator of a Leonard group. Likewise the excitation of the generating unit itself in a Leonard group might be acted upon.

In these different applications, the speed of the driven member of the machine controlled may be varied in a continuous way.

In place of the rheostat 14 the four way switch 20 shown in perspective in Fig. 5 may be arranged in the barrel 6 of the portable set. The spindle 21 carrying the revoluble wiper 22 of the switch is rigidly connected with the pinion 9 which, as above described, is operated by the trigger 4.

In the event that several speeds are required to be regulated, the switch 20 enables the controlling circuits, four in this example, to be closed sequentially, these circuits controlling in turn, for example, four circuits for different fractions of the exciting circuit of a Leonard group.

In Figs. 6 to 9 are shown several modifications of the operative connection between the trigger 4 of the portable control set of the invention and the cam or other control member for the motion which requires to be controlled or adjusted, the said operative connection taking the place of the bevel pinions 8 and 9 of the form shown in Fig. 2.

The transmission can be accomplished for example (as shown in Fig. 6), by means of a steep pitch screw 33. Any stress exerted lengthwise on this screw in either direction through the intermediary of the link 34 pivoted to the trigger 4, causes the cam 10 (or any other suitable control or regulation member such as a rheostat, a switch, etc. as described in the foregoing examples) to be rotated. A ball bearing 35 may be interposed if required between the hub of the cam 10 and its supporting bracket in the body 1 of the portable control set.

The transmission can also be accomplished (as shown by Fig. 7) by means of a lever and link system 36—37, the links 37 being, for example, articulated to lever 36 and trigger 4 to provide a flexible connection. The lever 36 is operatively connected by a hub to a shaft 21 on which is mounted the cam 10 or any other controlling member (see Figs. 2, 3 and 5 above).

Where the rotational axes of the trigger 4 and controlling member (cam, rheostat, commutator, etc.) are arranged parallel, one of the types of transmissions represented in Figs. 8 and 9, namely spur pinions 38—39 or lever system 40—41 may be used.

Any other transmission might be adopted, for example one using helical gears replacing the bevel pinions 8, 9 of the form shown in Fig. 2.

It will be seen from the foregoing that numerous advantages can be gained from the use of the above-described portable control set of which several possible constructional forms are set forth above. The use of this set primarily gives a greater flexibility of manipulation and a greater facility to the worker for effecting, from the position where he may operate to best advantage, all controls and adjustments which may be required, namely starting and stopping, stroke, speed or other adjustment of the operation, such adjustment being one consistent with the motion of the movable member which requires to be remotely adjusted or controlled. Due to this arrangement, the worker is in a position to carry out himself all manipulations that he may deem fit without requiring the help of an assistant, that is to say, with the utmost speed and accuracy. Speed and accuracy are still further increased due to the provision of the powerful illumination which is projected by the lamp of the set toward the position occupied by the workpiece or site of the operation. The worker's action is also facilitated due to the fact that he has a full grasp of his portable control set without being disturbed in any manner.

The control set according to the invention lends itself to miscellaneous uses, particularly in connection with the control of machine tools and hoisting or lifting equipment and more generally wherever a movable member belonging to any machine or apparatus requires to be controlled from a distance.

The above-described devices are given merely by way of examples. Other constructional forms of the invention might be easily conceived. Moreover, the devices as described and shown might receive minor constructional modifications without departing from the ambit of the invention.

What is claimed is:

1. In a portable controller for remote control of the operation of a machine, in combination, a hollow body formed with a depending portion adapted to be grasped by the hand, an electric control device arranged within said hollow body and having a member movable to different positions in the controlling operation of said device, said control device being adapted to be operatively connected to means for operating said machine to determine for each position a condition of operation of said machine, a spindle supported by said body for rotation thereof on its axis and operatively connected with said movable member of the control device, a trigger supported by said body for continuous movement relative thereto from an inoperative position and having a portion projecting out of said body positioned to be actuated by the fore finger of the hand grasping said depending portion of said body, bias means for urging said trigger to its inoperative position, and means providing a positive connection between said trigger and said spindle capable of producing uninterrupted rotational movement of said spindle forwardly and reversely respectively upon continuous movement of said trigger to and fro when actuated by the fore finger of the hand.

2. In a portable controller for remote control of the operation of a machine, the combination defined in claim 1 and in which the electric control device arranged within said hollow body is a rotary rheostat.

3. In a portable controller for remote control of the operation of a machine, the combination defined in claim 1 and in which the electric control device arranged within said hollow body is a rotary switch.

4. In a portable controller for remote control of the operation of a machine, the combination defined in claim 1 and in which a protective member is arranged about said portion of said trigger projecting out of said body, a predetermined distance being left between said protective member and said portion of said trigger so as to leave room for the insertion of the fore finger of the hand grasping said depending portion of said body.

5. In a portable controller for remote control of the operation of a machine, the combination with a control device having a member movable to different positions in the controlling operation of said device, said control device being capable of controlling the operation of said machine when connected thereto upon operation of said device and move said member thereof to different positions to determine for each position a condition of operation of said machine, of a body supporting said control device and formed with a portion adapted to be grasped by one hand, an element supported for pivotal movement thereof on said body and adapted to be actuated by a finger of said hand which grasps said portion of said body, a spindle supported by said body for rotation thereof on its axis, means providing a continuously operative kinematic connection between said pivoted element and said spindle capable of producing uninterrupted rotational movement of said spindle forwardly and reversely respectively upon continuous pivotal movement of said element from a retracted position to an advanced position and return to said retracted position when actuated by said finger of said hand and for arresting rotation of said spindle when said finger arrests movement of said element, and means operatively connecting said spindle to said member of said control device for effecting movement of said member to different machine controlling positions and for arresting movement of said member in any position to determine the operation of said machine upon forward movement of said pivoted element from said retracted position and arresting thereof in a corresponding forward position.

6. In a controller for control of the operation of a machine, in combination, a body formed with a depending portion adapted to be grasped by the hand, a control device supported by said body and having a member movable to different positions in the controlling operation of said device, said control device being adapted to be operatively connected to means for operating said machine to determine for each position a condition of operation of said machine, a spindle supported by said body for rotation thereof on its axis and operatively connected with said movable member of the control device for effecting movement of said member forwardly and reversely to and from said different positions upon forward and reverse rotation of said spindle, an element adapted to be actuated by a finger of said hand which grasps said depending portion of said body and supported by said body for movement relative thereto from an inoperative position and return thereto, bias means for urging said element to said inoperative position, and means providing a positive connection between said element and said spindle capable of producing uninterrupted rotational movement of said spindle forwardly and reversely respectively upon continuous movement of said element to and fro when actuated by the finger of the hand.

CHARLES WILLIAM BERTHIEZ.

REFERENCES CITED

The following references are of record in the file of this patent:

UNITED STATES PATENTS

| Number | Name | Date |
|---|---|---|
| 652,941 | Whitney | July 3, 1900 |
| 911,139 | Luense | Feb. 2, 1909 |
| 1,017,150 | Holme | Feb. 13, 1912 |
| 1,681,214 | Blair | Aug. 21, 1928 |
| 1,767,146 | Lee | June 24, 1930 |
| 1,827,372 | Riddell | Oct. 13, 1931 |
| 2,082,256 | Netschke | June 1, 1937 |
| 2,290,250 | Russell | July 21, 1942 |
| 2,350,680 | Heintz | June 6, 1944 |
| 2,381,077 | Obszarny | Aug. 7, 1945 |
| 2,390,846 | Obszarny | Dec. 11, 1945 |

FOREIGN PATENTS

| Number | Country | Date |
|---|---|---|
| 18,398 | Germany | Nov. 29, 1881 |
| 616,141 | France | Oct. 25, 1926 |